United States Patent [19]

Levin

[11] Patent Number: 5,416,688
[45] Date of Patent: May 16, 1995

[54] COMBINED PHASE-SHIFTING DIRECTIONAL ZERO PHASE SEQUENCE CURRENT FILTER AND METHOD FOR USING THEREOF

[76] Inventor: Michael Levin, 33 Bayhampton Court, Downsview, Ontario, Canada, M3H 5L5

[21] Appl. No.: 87,979

[22] Filed: Jul. 7, 1993

[51] Int. Cl.⁶ .............................................. H02J 1/02
[52] U.S. Cl. ...................................................... 363/39
[58] Field of Search ..................... 363/36, 39, 74, 102, 363/104, 152; 323/215, 232, 361; 307/105; 318/780, 809

[56] References Cited

U.S. PATENT DOCUMENTS

| | | | |
|---|---|---|---|
| 1,537,371 | 5/1925 | Petersen | 363/39 |
| 1,953,233 | 4/1934 | Jonas | 363/39 |
| 2,194,412 | 3/1940 | Trabut | 363/39 |
| 2,212,399 | 8/1940 | Kochling | 363/39 |
| 2,312,571 | 3/1943 | Meyer | 363/39 |
| 2,824,978 | 2/1958 | Knudsen | 363/39 |
| 3,875,509 | 4/1975 | Milkovic | 324/142 |
| 4,442,385 | 4/1984 | Van Sickle | 318/140 |
| 4,479,082 | 10/1984 | Schauder et al. | 318/809 |
| 4,531,085 | 7/1985 | Mesenhimer | 323/214 |
| 4,896,092 | 1/1990 | Flynn | 323/258 |
| 4,967,334 | 10/1990 | Cook et al. | 363/34 |
| 5,005,115 | 4/1991 | Schauder | 363/159 |
| 5,063,532 | 11/1991 | Takeda et al. | 364/825 |
| 5,206,539 | 4/1993 | Kammeter | 307/105 |
| 5,321,598 | 6/1994 | Moran | 363/74 |
| 5,323,304 | 6/1994 | Woodworth | 363/39 |

OTHER PUBLICATIONS

Electricity Today Magazine, May–Jul. 1992, pp. 1–12. Martin Baier, P. Eng. "Pros and Cons of Zero Sequence Harmonic Trap Applications in 120/208 V Distribution Systems."
Power Quality, Sep./Oct. 1991, pp. 33–37. Robert H. Lee, R. H. Lee Eng. "Eliminating Harmonic Currents Using Transformers."
Electrical Systems Engineer, Spring 1990, p. 28. Tony Hoevenaars, P. Eng., Michael Levin, P. Eng., and Philip J. A. Ling. "A Case Study in Cutting Power System Harmonics."
I.E.E.E., 1990, Abstract. "Application of Zigzag Transformers for Reducing Harmonics in the Neutral Conductor of Low Voltage Distribution System."
IBM Canada Ltd., Feb. 24, 1988, pp. 1–5. Ferguson Engineering Services, Inc. "North Tower Extension: Zero Sequence Filter Performance Test and Analysis."

*Primary Examiner*—Thomas M. Dougherty
*Assistant Examiner*—Matthew V. Nguyen

[57] ABSTRACT

The windings of a wye-connected primary are tapped and connected in a zig-zag fashion to secondary windings. The resulting filter provides phase shifting of load currents and directional filtering of zero phase sequence harmonic currents. The taps may be varied to adjust the voltage output of the apparatus.

10 Claims, 1 Drawing Sheet

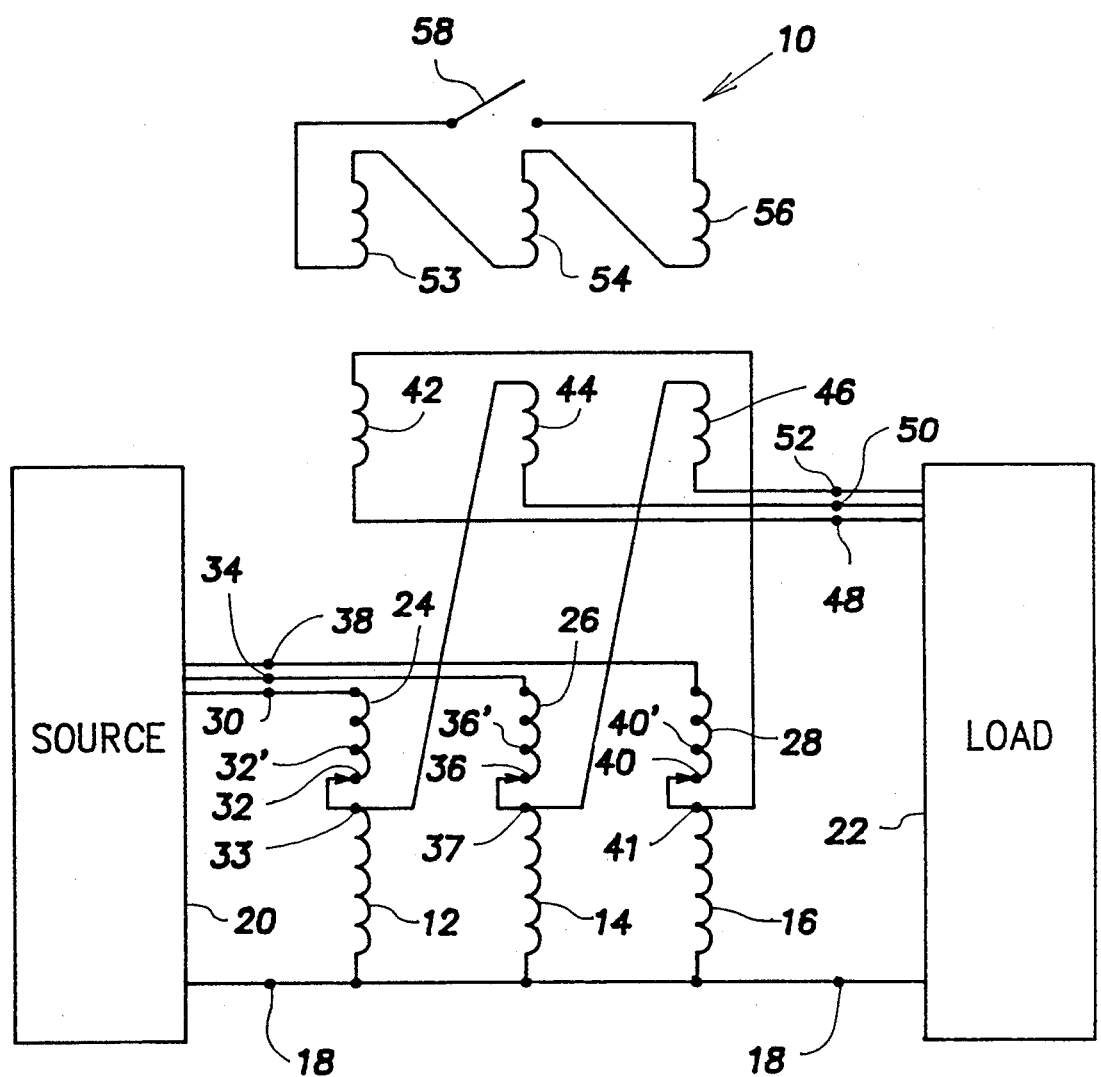

COMBINED PHASE-SHIFTING DIRECTIONAL ZERO PHASE SEQUENCE CURRENT FILTER AND METHOD FOR USING THEREOF

BACKGROUND OF THE INVENTION

The present invention relates to three-phase power conditioning filters and, in particular, to zero phase sequence filters.

Harmonic-producing loads are becoming an increasingly large portion of the electrical load in many buildings and installations. Non-linear loads such as the switching mode power supplies found in personal computers can result in substantial harmonic content in a building's electrical distribution system.

Particularly troublesome are the zero phase sequence harmonics introduced by single phase switching mode power supplies. These zero phase harmonics (3rd, 9th, 15th, . . . ) are so called because they are all in phase with each other, no matter which of the three electrical power phase conductors they are on. As a result, their currents are additive on the neutral conductor.

Together with unbalanced portions of the fundamental and other harmonic currents, the resulting current in the neutral conductor can overload the neutral conductor, easily surpassing the current in each of the three phase conductors.

In addition to overloading the neutral conductors, this results in high common-mode noise level (neutral to ground voltage), increased total harmonic distortion level, voltage imbalance, increased losses, etc.

Non-linear loads not only generate zero phase sequence harmonics, they also create 5th, 7th, 11th, 13th, . . . harmonics. These harmonics also contribute to distortion and overall degradation of the distribution system.

Various techniques have been used to try to mitigate these problems.

For zero phase harmonics, zero phase sequence filters have been used. Unfortunately, these filters attract zero sequence currents from not only the load (downstream) side of the filter, but also from the source (upstream) side. This can easily result in a overloaded filter and/or an overloaded feeder neutral conductor despite the fact that the filter is correctly sized for the expected loads. Often the designer has no control over the upstream zero sequence currents and must substantially overspecify the filter.

Prior art zero sequence filters also significantly increase single phase fault levels. They also do not provide any relief from any non-zero phase sequence harmonics.

To reduce their level phase-shifting transformers (typically 1:1) can be employed, but are expensive.

Unless low impedance (and very expensive) transformers are used, these transformers introduce relatively high impedance into the power system. As a result, voltage total harmonic distortion increases.

SUMMARY OF THE INVENTION

The present invention provides directional zero phase sequence filtering. It also provides phase-shifting for aid in dealing with other troublesome harmonics, less increase (if any) in single phase fault levels, low impedance and reduction of current and voltage imbalance. In addition, it may be advantageously configured to provide voltage adjustment.

The invention includes a filter for connection between a three-phase power source and a three-phase load. The source has a fundamental frequency, a first phase source conductor, a second phase source conductor and a third phase source conductor. The load has a first phase load conductor, a second phase load conductor and a third phase load conductor. The source and load having a common neutral conductor.

The filter has a first winding having a first and second tap. The first tap is connectable to the first source conductor.

A second winding has a first and second tap. The second winding first tap is connectable to the second source conductor.

A third winding has a first and second tap. The third winding first tap is connectable to the third source conductor.

A fourth winding is magnetically coupled to the first winding and has a first and second tap. The fourth winding first tap is connected to the first winding second tap and the fourth winding second tap is connectable to the neutral conductor.

A fifth winding is magnetically coupled to the second winding and has a first and second tap. The fifth winding first tap is connected to the second winding second tap and the fifth winding second tap is connectable to the neutral conductor.

A sixth winding is magnetically coupled to the third winding and has a first and second tap. The sixth winding first tap is connected to the third winding second tap and the sixth winding second tap is connectable to the neutral conductor.

A seventh winding is magnetically coupled to the first winding and has a first and second tap. The seventh winding first tap is connected to the sixth winding first tap and the seventh winding second tap is connectable to the first phase load conductor.

An eighth winding is magnetically coupled to the second winding and has a first and second tap. The eighth winding first tap is connected to the fourth winding first tap and the eighth winding second tap is connectable to the second phase load conductor.

A ninth winding is magnetically coupled to the third winding and has a first and second tap. The ninth winding first tap is connected to the fifth winding first tap and the ninth winding second tap is connectable to the third phase load conductor.

BRIEF DESCRIPTION OF THE DRAWINGS

The FIGURE is a schematic diagram of a filter according to the invention.

DESCRIPTION OF THE PREFERRED EMBODIMENTS

Referring to the figure, a filter 10 includes windings 12, 14, 16. One tap of the windings 12, 14, 16 is connected to a neutral conductor 18. In use, the neutral conductor 18 is connected between the neutral conductor of a three-phase power source 20 and the neutral conductor of a three-phase load 22.

The windings 24, 26, 28 are magnetically coupled to the windings 12, 14, 16, respectively.

One tap of the winding 24 is connected in use to the first phase source conductor 30 and another tap 32 is connected to the other tap 33 of the winding 12.

One tap of the winding 26 is connected in use to the second phase source conductor 34 and another tap 36 is connected to the other tap 37 of the winding 14.

One tap of the winding 28 is connected in use to the third phase source conductor 38 and another tap 40 is connected to the other tap 41 of the winding 16.

The windings 24, 26, 28 can be provided with alternative taps, for example, taps 32', 36', 40'.

The windings 42, 44, 44, are magnetically coupled to the windings 24, 26, 28, respectively (as well as to the windings 12, 14, 16, respectively).

One tap of the winding 42 is connected in use to the first phase load conductor 48 and the other tap is connected to the tap 41 of the winding 16.

One tap of the winding 44 is connected in use to the second phase load conductor 50 and the other tap is connected to the tap 33 of the winding 12.

One tap of the winding 46 is connected in use to the third phase load conductor 52 and the other tap is connected to the tap 37 of the winding 14.

An additional set of windings 53, 54, 56 may be optionally provided. The winding 53 is magnetically coupled to the windings 12, 24, 42. The winding 54 is magnetically coupled to the windings 14, 26, 44. The winding 56 is magnetically coupled to the windings 16, 28, 46.

The additional windings 53, 54, 56 are connectable in a delta configuration through a switch 58.

In operation, the load or zig-zag side of the filter 10 provides a very low impedance to any zero sequence currents generated by the load 22, attenuating zero sequence harmonics in the system.

This is in contrast to the impedance seen by zero sequence currents on the source or wye side of the filter 10. The zero sequence impedance for the wye side is, for example, 20 to 50 times higher than that of the zig-zag side.

It is this difference between the load side zero sequence impedance and the source side impedance that provides the filter with its directionality. The flow of zero phase sequence currents generated by the load into the system are greatly attenuated while source zero sequence currents are largely ignored.

This allows a designer to specify a filter 10 according to expected loads rather than having to guess what source zero sequence currents may be present.

In addition, there is a reduction of voltage harmonic distortion created by the zero phase sequence currents.

In the preferred embodiment, the ratio of the windings are chosen to provide about a 30° phase shift through the filter 10. This results in any load side 5th, 7th, 17th, 19th, ... harmonics being shifted accordingly when they appear on the source side. These shifted harmonics combined with any unshifted 5th, 7th, 17th, 19th, ... harmonics already on the system tend to cancel (much like a twelve.-pulse rectifier system).

For example, the windings 12, 14, 16, 42, 44, 46 may be designed for three volts per turn. The windings 24, 26, 28 may be 73% of the turns of the windings 12, 14, 16, 42, 44, 46. The windings 53, 54, 56 may be 67% of the turns of the windings 12, 14, 16, 42, 44, 46.

Also, the filter 10 reduces (or eliminates) increases in single phase fault levels, provides current balancing and reduces neutral to ground voltage (common mode noise).

This all improves power factor, system losses and the available capacity of the system.

In addition, different taps (for example tap 32' instead of tap 32) can be selected to adjust the voltage level supplied to the load 22. Such known techniques as off-load tap changers can be employed. Either the connection of the taps of the windings 24, 26, 28 to the windings 12, 14, 16 can be varied or the connection of the taps of the windings 24, 26, 28 to the source conductors 30, 34, 38 can be varied.

If less directionality is desired, the switch 58 can be closed thereby bringing the optional windings 53, 54, 56 into play.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A filter for connection between a three-phase power source and a three-phase load, said source having a fundamental frequency, a first phase source conductor, a second phase source conductor and a third phase source conductor, said load having a first phase load conductor, a second phase load conductor and a third phase load conductor, and said source and said load having a common neutral conductor, said filter comprising:

a first winding having a first and second tap, said first tap being connectable to said first source conductor;

a second winding having a first and second tap, said second winding first tap being connectable to said second source conductor;

a third winding having a first and second tap, said third winding first tap being connectable to said third source conductor;

a fourth winding magnetically coupled to said first winding and having a first and second tap, said fourth winding first tap being connected to the first winding second tap and said fourth winding second tap being connectable to said neutral conductor;

a fifth winding magnetically coupled to said second winding and having a first and second tap, said fifth winding first tap being connected to the second winding second tap and said fifth winding second tap being connectable to said neutral conductor;

a sixth winding magnetically coupled to said third winding and having a first and second tap, said sixth winding first tap being connected to the third winding second tap and said sixth winding second tap being connectable to said neutral conductor;

a seventh winding magnetically coupled to said first winding and having a first and second tap, said seventh winding first tap being connected to the sixth winding first tap and said seventh winding second tap being connectable to said first phase load conductor;

an eighth winding magnetically coupled to said second winding and having a first and second tap, said eighth winding first tap being connected to the fourth winding first tap and said eighth winding second tap being connectable to said second phase load conductor; and a ninth winding magnetically coupled to said third winding and having a first and second tap, said ninth winding first tap being connected to the fifth winding first tap and said ninth winding second tap being connectable to said third phase load conductor.

2. A filter according to claim 1, further comprising a tenth winding magnetically coupled to said first winding, an eleventh winding magnetically coupled to said second winding, and a twelfth winding magnetically coupled to said third winding, said tenth, eleventh, and twelfth windings being connected in a delta configuration.

3. A filter according to claim 2, further comprising selection means to open and close said delta configuration.

4. A filter according to claim 1, wherein said second taps of said first, second and third windings are adjustable.

5. A filter according to claim 1, wherein a three-phase fundamental frequency source voltage applied to said filter is phase-shifted by about 30°.

6. A method for power conditioning using a filter for connection between a three-phase power source having source zero phase sequence harmonics and a three-phase load producing load zero phase sequence harmonics, said source having a first phase source conductor, a second phase source conductor and a third phase source conductor, said load having a first phase load conductor, a second phase load conductor and a third phase load conductor, and said source and said load having a common neutral conductor, said method comprising:

providing a first winding having a first and second tap, said first tap being connected to said first source conductor;

providing a second winding having a first and second tap, said second winding first tap being connected to said second source conductor;

providing a third winding having a first and second tap, said third winding first tap being connected to said third source conductor;

providing a fourth winding magnetically coupled to said first winding and having a first and second tap, said fourth winding first tap being connected to the first winding second tap and said fourth winding second tap being connected to said neutral conductor;

providing a fifth winding magnetically coupled to said second winding and having a first and second tap, said fifth winding first tap being connected to the second winding second tap and said fifth winding second tap being connected to said neutral conductor;

providing a sixth winding magnetically coupled to said third winding and having a first and second tap, said sixth winding first tap being connected to the third winding second tap and said sixth winding second tap being connected to said neutral conductor;

providing a seventh winding magnetically coupled to said first winding and having a first and second tap, said seventh winding first tap being connected to the sixth winding first tap and said seventh winding second tap being connected to said first phase load conductor;

providing an eighth winding magnetically coupled to said second winding and having a first and second tap, said eighth winding first tap being connected to the fourth winding first tap and said eighth winding second tap being connected to said second phase load conductor;

providing a ninth winding magnetically coupled to said third winding and having a first and second tap, said ninth winding first tap being connected to the fifth winding first tap and said ninth winding second tap being connected to said third phase load conductor; and attenuating said load harmonics while substantially disregarding said source harmonics.

7. A method according to claim 6, further comprising providing a tenth winding magnetically coupled to said first winding, an eleventh winding magnetically coupled to said second winding, and a twelfth winding magnetically coupled to said third winding, said tenth, eleventh, and twelfth windings being connected in a delta configuration.

8. A method according to claim 7, further comprising providing selection means to open and close said delta configuration.

9. A method according to claim 6, wherein said second taps of said first, second, and third windings are adjustable.

10. A method according to claim 6, wherein a three-phase fundamental frequency source voltage applied to said filter is phase-shifted by about 30°.

* * * * *